United States Patent
Celi, Jr.

(10) Patent No.: US 6,535,931 B1
(45) Date of Patent: Mar. 18, 2003

(54) EXTENDED KEYBOARD SUPPORT IN A RUN TIME ENVIRONMENT FOR KEYS NOT RECOGNIZABLE ON STANDARD OR NON-STANDARD KEYBOARDS

(75) Inventor: Joseph Celi, Jr., Boca Raton, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/460,096

(22) Filed: Dec. 13, 1999

(51) Int. Cl.$^7$ ............................................... G06F 13/00
(52) U.S. Cl. ..................... 710/1; 710/1; 710/2; 710/5; 710/7; 710/20; 710/21; 710/67; 710/73
(58) Field of Search ............................... 710/1, 2, 5, 7, 710/20, 21, 67, 73

(56) References Cited

U.S. PATENT DOCUMENTS

| | | | |
|---|---|---|---|
| 5,086,503 A | | 2/1992 | Chung et al. |
| 5,197,147 A | | 3/1993 | Long et al. |
| 5,249,287 A | | 9/1993 | MacDonald et al. |
| 5,467,433 A | * | 11/1995 | Lamprecht, Jr. et al. ... 358/1.15 |
| 5,640,540 A | | 6/1997 | Ansberry et al. |
| 5,642,110 A | | 6/1997 | Raasch et al. |
| 5,867,729 A | * | 2/1999 | Swonk ........................... 710/8 |
| 6,084,584 A | * | 7/2000 | Nahi et al. ................... 345/864 |
| 6,213,880 B1 | * | 4/2001 | Sim .............................. 463/37 |
| 6,320,519 B1 | * | 11/2001 | Hsu et al. ...................... 341/23 |

* cited by examiner

Primary Examiner—Jeffrey Gaffin
Assistant Examiner—Mohammad O. Farooq
(74) Attorney, Agent, or Firm—Joseph C. Redmond, Jr.; Morgan & Finnegan, LLP

(57) ABSTRACT

A keyboard is programmatically adapted to enable an application in a run time environment to distinguish operator keys (ALT/CTRL), not otherwise recognizable on a standard keyboard and special keys not otherwise recognizable on a non-standard keyboard by the application, when actuated. In one embodiment, a native Dynamic Link Library (DLL) is created in memory to capture the keystroke stream and maintain state information about the keyboard. A Java Native Interface (JNI) is created in the DLL and provided to a Java application. At initialization time, the Java application loads the native DLL with extended program instructions relating to key recognition in its static constructor. The Java application receives notification when an ALT or CTRL key is actuated. At that time the Java application calls the native DLL to receive the extended program instruction to determine whether the right or left ALT or CTRL key was actuated. The DLL programmatically determines whether the right or left ALT or CTRL key was struck. The DLL provides the Java application a flag that allows the application to determine if a "right" or a "left" (ALT/CTRL) key was actuated. On a non-standard keyboard, the Java application calls the native DLL to receive the necessary information on the key that was actuated. Again, the DLL programmatically provides a flag and extended keystroke data that allows the Java application to determine if a special key was actuated.

17 Claims, 4 Drawing Sheets

Default keystroke flow in a Java environment

Enhanced keystroke flow in a Java environment

EXTENDED KEYBOARD SUPPORT IN A RUN TIME ENVIRONMENT FOR KEYS NOT RECOGNIZABLE ON STANDARD OR NON-STANDARD KEYBOARDS

BACKGROUND OF THE INVENTION

1. Field of the Invention

This invention relates to keyboards as input devices to computer systems and methods of operation. More particularly, the invention relates to extended keyboard support for keys not recognizable on standard or non-standard keyboards for computer systems operating in a run time environment.

2. Description of Prior Art

Computer systems operating in an interpretive or run time environment decode program instructions "on the fly" without compiling the instructions and generating machine code for the instructions as in many computer operating systems. Several programming languages are available for writing applications executable in a run time environment. JAVA, a programming language created by Sun Micro Systems, Mountain View, Calif. is one popular programming language for writing applications operating in a run time environment. However, keyboard support has been found lacking in Java applications, or applications prepared in Java programming language. In particular, a Java application has no means to differentiate between the press of the right hyphen ALT or the left hyphen ALT key. The same holds true for the CTRL left and right keys. Further shortcomings come into play when Java applications are needed to perform actions based on special keys included on non-standard keyboards. Many of these non-standard keyboards include keys above and beyond the standard 101 key keyboard. Java applications do not appear to receive adequate information from the Java environment to determine which special key was actuated. The returned information for special keys is insufficient when using the classes provided by the Sun and Microsoft Java development kits (JDK's) used to build Java applications. What is needed in the art is a method for Java applications to obtain necessary information required to distinguish the "right" from the "left" (ALT and CTRL keys). It is also desirable for Java applications to have a method to receive complete scan code information for special keys on non-standard keyboards.

Prior art related to keyboard management includes:

U.S. Pat. No. 5,086,503 to C. Y. Chung et al., issued Feb. 4, 1992, discloses remapping of keyboards using a plurality of terminal emulators which are included in a computer system requiring different keyboard inputs. The keyboard program is activated to display one of a plurality of keyboard layouts to be remapped for a selected emulator. A plurality of definitions is displayed in response to the selection of a key in the displayed keyboard layout. An action is then selected to modify one or more definitions of the selected key. Thereafter, a plurality of keys and their respective definitions may be simultaneously displayed.

U.S. Pat. No. 5,197,147 to M. L. Long et. al., issued Mar. 23, 1993, discloses a keyboard translation system providing translations between a keycode sent to the keyboard controller of the computer and the code sent from the keyboard controller to the CPU. A control ROM is used to select translated key code signals from a keycode look-up table under the control of program counter and keyboard keycode signals from the keyboard. These translated signals then are supplied through an accumulator to the CPU of the computer.

U.S. Pat. No. 5,249,287 to J. R. MacDonald et al., issued Sep. 28, 1993, discloses a keyboard interface which includes a first keyboard logic responsive to a first mode select signal for providing a first set of control signals and a second keyboard logic responsive to second mode select signal for providing a second set of control signals. A multiplexer couples the first set of control signals to the set of terminals responsive to the first mode select signal and couples a second set of control signals to the set of terminals responsive to the second mode select signal. A keyboard register provides the first or second mode select signal to the first and second keyboard logic in the multiplexer.

U.S. Pat. No. 5, 640,540 to C. M. Ansberry et al., issued Jun. 17, 1997, describes a software solution that allows varying keystroke information coming from an X server to be interpreted correctly on a remote computer system that may have a different keyboard configuration than that of the server. Each remote system is queried by the server for it's unique keyboard configuration. The server then sends the appropriate keyboard translation codes to the remote system.

U.S. Pat. No. 5,642,110 to C. F. Raasch et al., issued Jun. 24, 1997, discloses a memory mapped keyboard controller. In a first mode of operation the controller activates all the columns and monitors all the rows in a keyboard switch matrix to detect when any one or more of the key rows becomes active. When any row in the matrix is detected as active, then the keyboard controller enters a second mode where it selectively activates individual columns and monitors the rows in the switch matrix to determine which row and column contain the activated switch. When the switch location is determined, location is interpreted by the keyboard controller into a scanned code for use in Industry Standard Architecture (ISA).

None of the prior art discloses a keyboard programmatically adapted to enable a application operating in a run time environment, particularly a Java application to recognize keys otherwise non-recognizable keys in a standard keyboard or special keys not otherwise recognizable in a non-standard keyboard, when actuated.

SUMMARY OF THE INVENTION

An object of the invention is an improved keyboard and method of operation for interfacing with an application executing in a run time environment in a computer system and facilitating recognition of keys not otherwise recognizable by the application.

Another object is an improved keyboard and method of operation for interacting with a Java application executing in a computer system and facilitating the recognition of operator keys in a standard keyboard.

Another object is an improved keyboard and method of operation for interfacing with a Java application executing in a computer system and facilitating the recognition of special keys in a non-standard keyboard.

Another object is an improved keyboard and method of operation for interfacing with a Java application executing in a computer system and facilitating the recognition of "left" or "right" ALT/CTRL keys in a standard keyboard.

Another object is an improved keyboard and method of operation for interfacing with a Java application executing in a computer system and facilitating the recognition of special keys in a non-standard keyboard.

These and other objects, features and advantages are achieved in one embodiment including a keyboard programmatically adapted to enable a Java application executing in a runtime environment to distinguish keys (ALT/CTRL), not otherwise recognizable on a standard keyboard and special keys not otherwise recognizable on a non-standard keyboard, when actuated. A native Dynamic Link Library (DLL) is created in memory to capture a keystroke stream and maintain state information about the keyboard. A Java Native Interface (JNI) is created in a DLL and provided to the Java application. At initialization time, the Java application loads the native DLL from within its static constructor. The native DLL contains extended program instructions related to key recognition and state information. The Java application receives notification when an ALT or CTRL key is actuated. At that time, the Java application calls the native DLL to get program instruction to determine whether a "right" or "left" ALT or CTRL key was actuated. The DLL programmatically determines whether the "right" or "left" ALT or CTRL key was struck. The DLL provides the Java application a flag that allows the application to determine if the "right" or "left" ALT/CTRL key was actuated. On a non-standard keyboard, the Java application calls the native DLL to receive the necessary information on the key that was actuated. Again, the DLL programmatically provides a flag that allows the Java application to determine if the special key was actuated.

DESCRIPTION OF DRAWING

The invention will be further understood from the following detailed description of a preferred embodiment taken in conjunction with an appended drawing, in which.

DESCRIPTION OF PREFERRED EMBODIMENT

Figure 1:
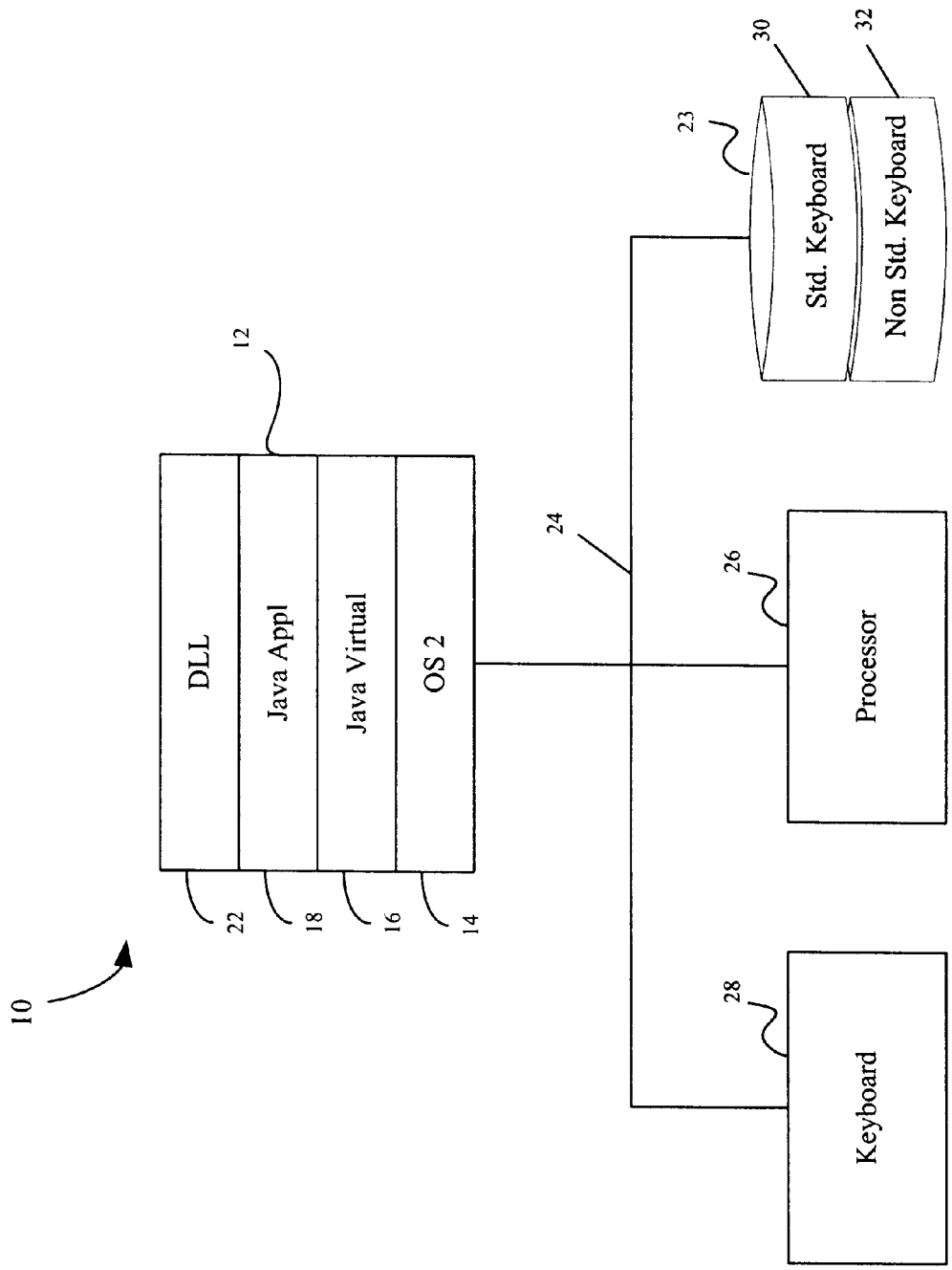
FIG. 1 is a block diagram of one embodiment of a computer system executing a Java application in a run time environment and incorporating the principles of the present invention.

In FIG. 1 a computer system 10 executing in a run time environment includes a memory 12 for storing program instructions for an operating system 14, e.g. OS2, Windows, etc.; a Java Virtual Machine 16 interfacing with a Java application 18. The memory also stores a Dynamic Link Library (DLL) 22 for coupling the Java Virtual Machine to a disk 23 with extended keyboard support 30, 32 stored in the disk. The memory 12 is coupled through a bus 24 to the disk 22; a processor 26 and a standard keyboard or non-standard keyboard 28, as the case may be.

Figure 2:
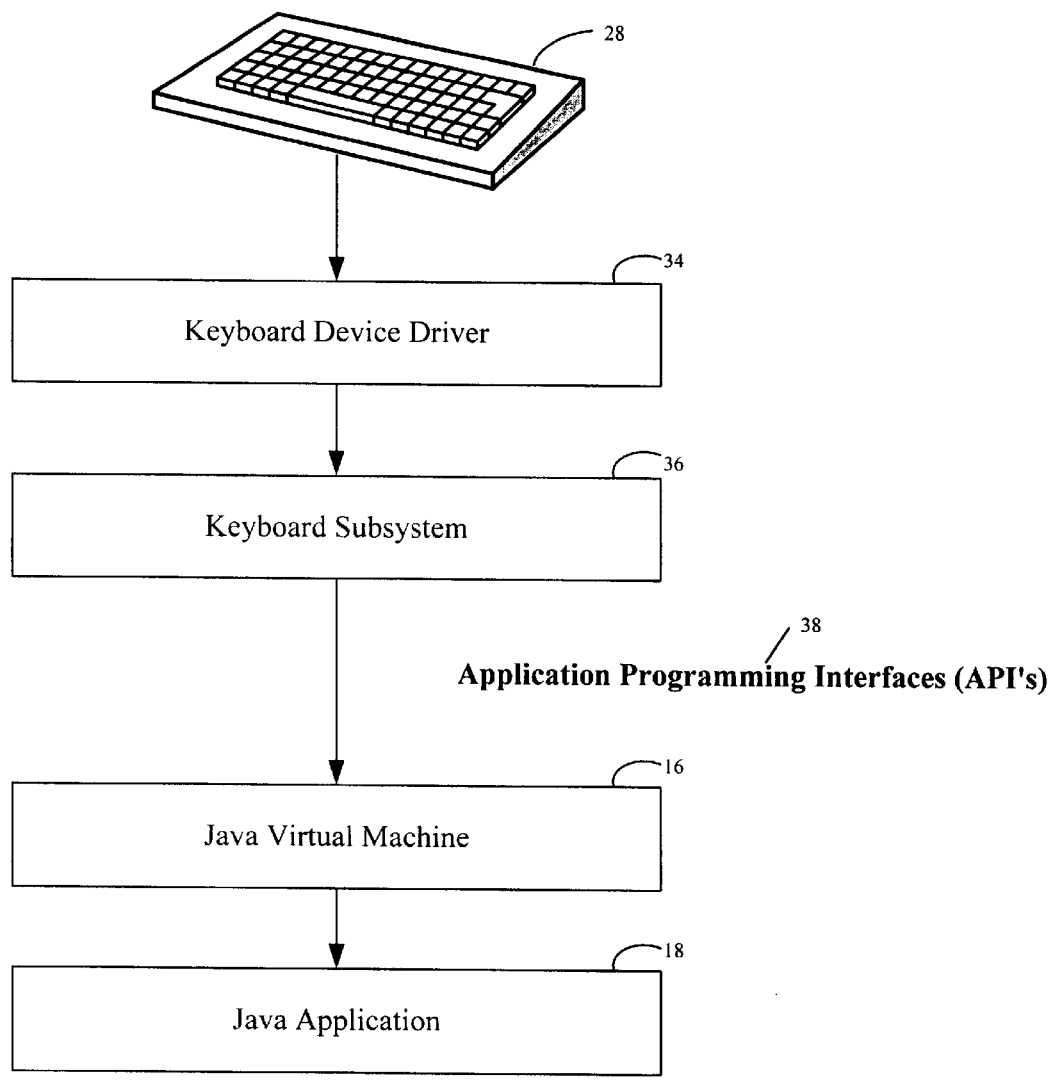
FIG. 2 is a flow diagram of a default keystroke in a Java environment executing in a computer system.

FIG. 2 depicts the keystroke flow of the keyboard 28 in the Java environment. A keyboard device driver 34 is a software component that interacts with the keyboard hardware to obtain information about the keys being actuated. In most cases this interaction is accomplished using a port I/O. A standard 101-type keyboard, plugged into the system keyboard port will generate a hardware interrupt whenever a key is pressed. The keyboard device driver 34 registers for interrupt notifications via an operating system dependent interface. Upon receiving an interrupt, the keyboard device driver reads the keyboard output data port to obtain the scan code information. The scan code information is then typically translated to a specific keycode that is more useful to higher level applications. The keyboard device driver will also interact with the keyboard hardware to form actions such as setting Light Emitting Diodes (LED's) or setting the typomattic, keystroke rate. A keyboard subsystem 36 interacts with the keyboard device driver and provides an Application Program Interface (API) 38 to applications. Applications can register for notification of keystroke events as they occur using the keyboard API. Applications can also asynchronously call the keyboard subsystem used in the API to obtain keyboard state information. The Java Virtual Machine 16 as depicted here, is an executable file that interprets Java applications. The Java Virtual Machine also interacts with the keyboard subsystem using the API's described. The Java Virtual Machine is described in the text, "Java Virtual Machines" by J. Mayer et al., published by O'Reilly & Associates, Inc., 101 Morris Street, Sebastopol, Calif. 95472. The text is fully incorporated herein by reference.

The Java application 18 is written in Java programming languages and uses another set of APIs that are provided by the Java Virtual Machine in the form of class libraries. Java is an interpretive language. To run a Java application, the Java Virtual Machine is run and provided with the name of the Java application. The class libraries are basically the components that are running in the virtual machine and make API' call to the keyboard subsystem.

Prior to the present invention, a Java application is limited to the keyboard functionality defined by the Java class libraries. These libraries do not provide a way for a Java application to distinguish the "left" and "right" ALT/CTRL keys.

Figure 3:
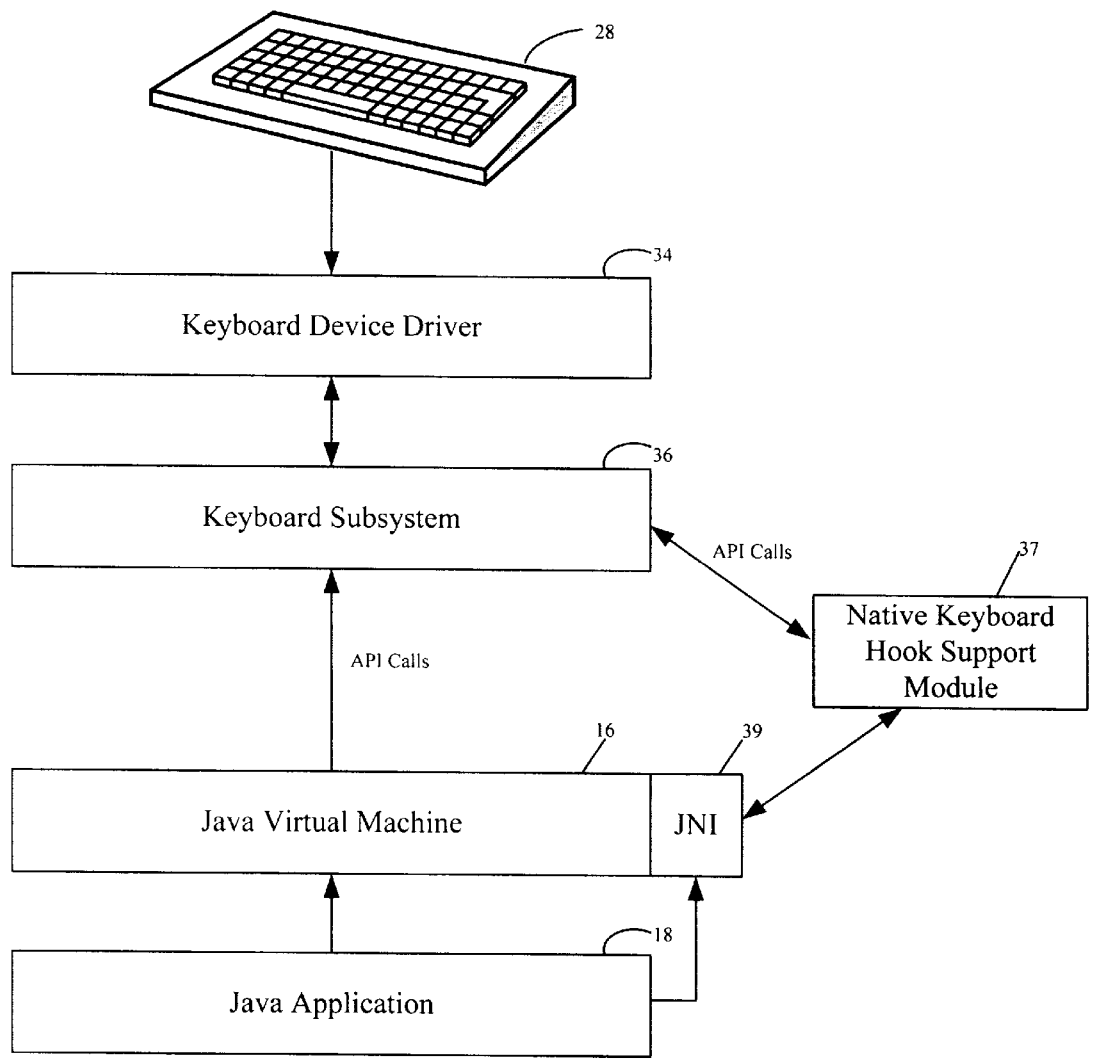
FIG. 3 is a flow diagram of enhanced keystroke flow in a Java application executing in the computer system of FIG. 1.

FIG. 3 depicts the keystroke flow in the Java environment using the approach of the present invention that enhances the keyboard functionality of Java applications to recognize "right" or "left" ALT/CTRL keys.

A native keyboard hook module 37 is added to the components of FIG. 2. The module 37 uses a Java Native Interface (JNI) 39 to extend the keyboard functionality that is available to Java applications. The module 37 flow that is actually a Dynamic Link Library (DLL) provides additional APIs that can be used for Java applications to supplement the keyboard support available in the Java class libraries. For example, a Java application can use an API to ask the module 37 "What was the last pressed key?" The API-supported by the DLL provides sufficient information to tell the Java application whether the ALT or CTRL key was a "right" or a "left" one. The software programming for the extended keyboard support with respect to the "right" or "left" ALT or CTRL keys will be described hereinafter in conjunction with FIG. 4.

The JNI is used by the Java application to communicate using APIs to the native keyboard module 37. Java native interfaces are described in the text "The Java Native Interface: Programmer's Guide & Specification" by S. Liang, published by Addison Wesley Longman, Inc., June 1999. The JNI allows Java code that runs within a Java Virtual Machine to operate with application libraries written in other languages such as C, C++, and assembly. In addition, an Invocation API allows the Java Virtual Machine to be embedded into the Java application. Programmers use the JNI to write native methods to handle those situations when an application cannot be written entirely in the Java programming language. Basically, the JNI serves as the glue between the native Java application and a native application for example, recognizing "right" or "left" ALT/CTRL keys as will be described in conjunction with FIG. 4.

Figure 4:
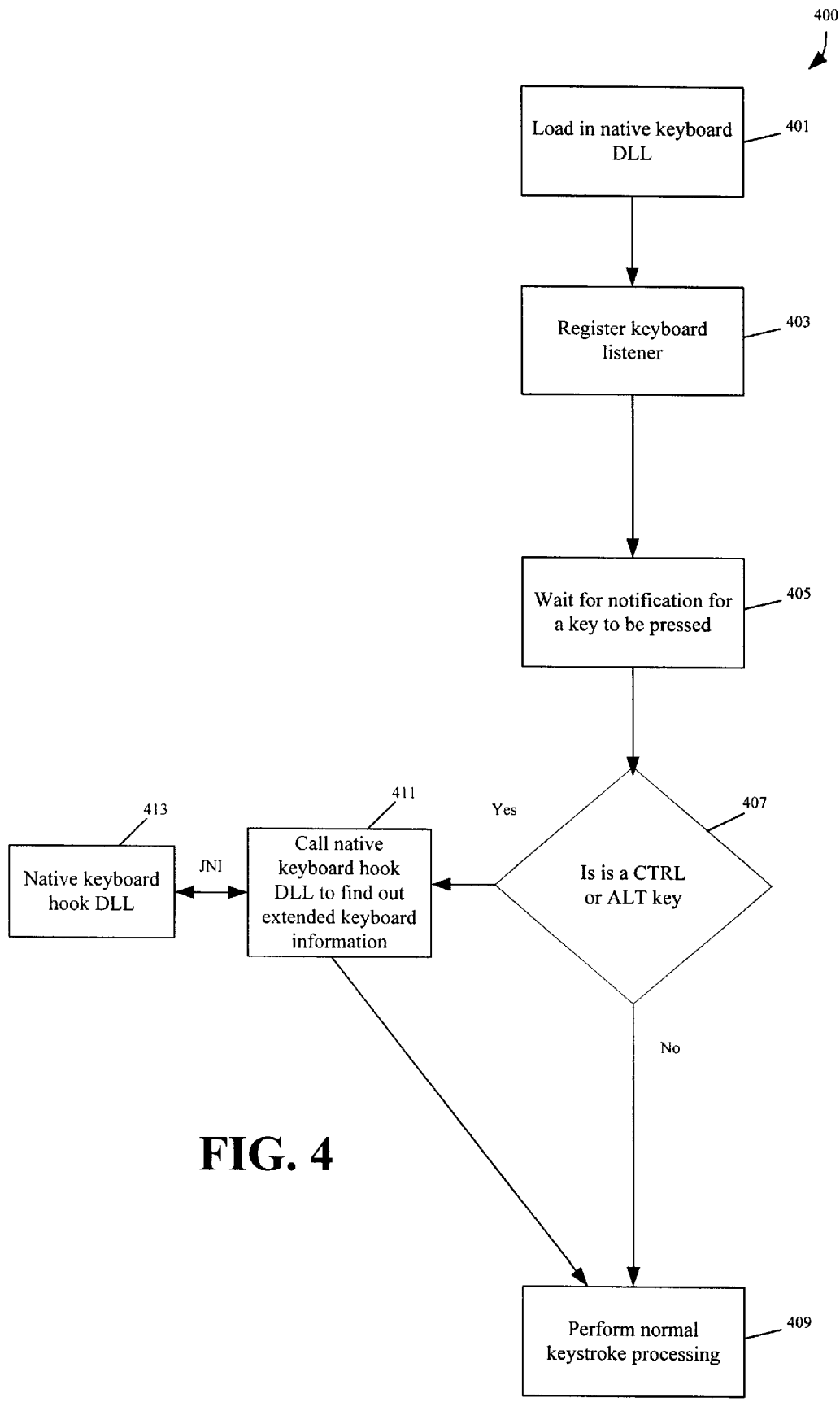
FIG. 4 is a flow diagram of the instructions initializing a Java application using extended keyboard support in the system of FIG. 1.

In FIG. 4, a process 400 for extending the keyboard support of the Java application is entered in step 401 in which the software for the extended keyboard support in native keyboard DLL is loaded into the Java Virtual Machine using an instance initialization method for the class. The Java class supports the recognition of the "right" or "left" ALT/CTRL keys. A keyboard listener is registered in step 403. The keyboard listener is a component class to receive key events from the keyboard. A key event component enables keystrokes defined by specified event mask parameters to be delivered to the DLL. Both the key listener and enable event components are described in the text "The Java Native Interface: Programmer's Guide & Specification", supra.

In block 405, the Java Virtual Machine is in an idle mode waiting for a key to be actuated. Upon key actuation, the Java Virtual Machine performs a test to determine if a CTRL or ALT key was actuated. A "no" condition initiates normal keystroke processing in step 409. A "yes" condition initiates step 411 in which the API call is placed by the keyboard subsystem to the support module 37 to obtain the extended keyboard support programming for the CTRL or ALT key. In step 413, the support module programmatically determines whether a "right" or "left" ALT or CTRL key was struck using standard key recognition programs written in other programming languages, e.g., C or C++. The support module passes the key recognition information through the Java Virtual Machine and the Java application via the Java Native Interface. The keystroke information for the "right" or "left" ALT/CTRL key is indicated by a flag that allows the Java application to determine if the key was a "right" or "left" key.

A representative program for determining whether a "right" or "left" ALT/CTRL key was struck as an input to a Java application is as follows:

```
public void keyReleased (KeyEvent e)
{
switch (e.getKeycode())
{
case KeyEvent.VK_CONTROL:
    // System.out.prinln("lsipClient::keyReleased - CTRL key Pressed");
    int iKeyState = khGetKeyState();
    //System.out.println("lsipClient::keyReleased - iKeyState =
    " + iKeyState);
    if((iKeyState & 0x100) != 0)
    {
       System.out.println("lsipClient::keyReleased - Right-CTRL hit");
    }
    return;
    default:
       // System.out.println("lsipClient::keyReleased -
       " + e.getKeyCode
       () + " key return;
}
} // end of keyReleased method
```

Similarly, a representative program for determining whether a special key was struck on a non-standard keyboard as an input to a Java application is as follows:

```
public void keyReleased (KeyEvent e)
{
    switch (e.getKeyCode ())
    {
      case KeyEvent VK_CONTROL:
```

```
         // System.out.prinln("lsipClient::keyReleased -
         CTRL key Pressed");
         int iKeyState = khGetKeyState();
         // System.out.println("lsipClient::keyReleased -
         iKeyState ="=iKeyState);
         if ((iKeyState & 0x100) !=0)
         {
           System.out.println("lsipClient::keyReleased -
           Right-CTRL hit"):
         }
         return;
      case 255:       // This is coming back from the weird keyboard
         // System.out.println("lsipClient::keyReleased -
         Special unknown 255 key relea
         int iScanCode = khGetLastScanCode();
         System.out.println("lsipClient::keyReleased -
         iScanCode = " + iScanCode):
         return;
      default:
         // System.out.println("lsipClient::keyReleased -
         " + e.getKeycode() + "key
         return;
       }
} // end of keyReleased method
```

Summarizing, keyboard support for Java applications has been extended programmatically through recognizing "right" or "left" ALT/CTRL keys using native methods which are otherwise not recognizable as inputs to Java applications. A support module is included and embedded in the Java Virtual Machine. The support module is activated when a keyboard subsystem initiates an API call indicating a "right" or "left" ALT/CTRL key was struck. The support module determines the actual keys struck and passes the information to the Java application through a Java Native Interface (JNI). The keystroke information contains a flag, which allows the Java application to recognize whether the key struck was a "right" or "left" ALT/CTRL key. Similarly, the support module can provide the Java application with a keystroke stream including a flag indicating when a special key was struck on a non-standard keyboard not otherwise recognizable by the Java application.

While the invention has been shown and described in a preferred embodiment, various changes can be made without departing from the spirit and scope of the invention, as defined in the appended claims, in which.

I claim:

1. In a computer system including a processor and a memory, a keyboard programmatically adapted to enable an application in a runtime environment to recognize keys not otherwise recognizable on standard or non-standard keyboards, when actuated, comprising:

keyboard means generating a keystroke stream including keystrokes not otherwise recognizable by a Java application in the processor operating in the run time environment;

a native Data Link Library (DLL) including class libraries created and established in memory as a Java Virtual machine;

a native interface for accessing the executable Java program;

means for capturing and storing the keystroke stream for a Java application in the DLL via the interface; and program instructions in the DLL for identifying the keystrokes in real time not otherwise recognizable by the application for standard or non-standard keyboards.

2. The computer system of claim 1 further comprising:

means for providing a flag in the keystroke stream to enable the Java application to determine the actuated keys otherwise not recognizable by the application.

3. The computer system of claim 1 further comprising:

the native interface interfacing the Java Virtual machine running as an executable program and the keyboard.

4. The computer system of claim 1 wherein the keystrokes not otherwise recognizable by the application are "right" and "left" ALT/CTRL keys on a standard keyboard.

5. The computer system of claim 1 wherein the keystrokes not otherwise recognizable by the application are special keys on non-standard keyboards.

6. The computer system of claim 1 wherein the processor operates in a Java run time environment.

7. The computer system of claim 1 further comprising:

a support module coupled to the native interface and supplementing the program instructions.

8. The computer system of claim 7 wherein the support module further comprises:

Application Programming Interfaces (APIs) that can be used by applications to supplement the keyboard support available in class libraries.

9. The computer system of claim 7 wherein the support module further comprises:

native programs for recognizing keys not otherwise recognizable by the application.

10. The computer system of claim 9 wherein the native programs further comprise:

program instructions for recognizing "left" or "right" ALT/CTRL keys when actuated on standard keyboards.

11. The computer system of claim 9 wherein the native programs further comprise:

program instructions for recognizing special keys when actuated on non-standard keyboards.

12. In a computer system including a processor executing an application in a run time environment, a memory and a keyboard, a method for programmatically adapting the keyboard to enable an the application to recognize keys actuated not otherwise recognizable on standard or non-standard keyboards, comprising the steps of:

providing a keystroke stream including keystrokes from keys, not otherwise recognizable on standard or non-standard keyboard, by the application executing on the processor operating in a run time environment;

creating a native Data Link Library (DLL) including class libraries in memory and an interface for accessing the DLL;

storing program instructions in the DLL for identifying keystrokes not otherwise recognizable for standard and non-standard keyboards by the application; and providing a flag in the keystroke information stream to enable the application to recognize the keystroke, otherwise not recognizable by the application.

13. The method of claim 12 wherein the keystrokes, otherwise not recognizable by the application are "left" and "right" ALT/CTRL keys on standard keyboards.

14. The method of claim 12 wherein the keystrokes, otherwise not recognizable by the application are special keys on non-standard keyboards.

15. The method of claim 12 further comprising the step of:

operating the processor in a Java runtime environment.

16. The method of claim 12 further comprising the step of:

installing Application Programming Interfaces (APIs) in the DLL that can be used by applications to supplement the keyboard support available in class libraries.

17. The method of claim 12 wherein the interface is a native interface.

* * * * *